(No Model.)

J. I. McCALOP.
VEHICLE AXLE.

No. 331,805.   Patented Dec. 8, 1885.

WITNESSES:
W. W. Hollingsworth
Solon C. Kemon

INVENTOR:
J. I. McCalop
BY Munn & Co.
ATTORNEYS.

UNITED STATES PATENT OFFICE.

JAMES IRVIN McCALOP, OF CLINTON, NORTH CAROLINA.

VEHICLE-AXLE.

SPECIFICATION forming part of Letters Patent No. 331,805, dated December 8, 1885.

Application filed April 6, 1885. Serial No. 161,360. (No model.)

*To all whom it may concern:*

Be it known that I, JAMES IRVIN MC-CALOP, a citizen of the United States, residing at Clinton, in the county of Sampson and State of North Carolina, have invented certain new and useful Improvements in Axles for Vehicles, of which the following is a description.

Figure 1:
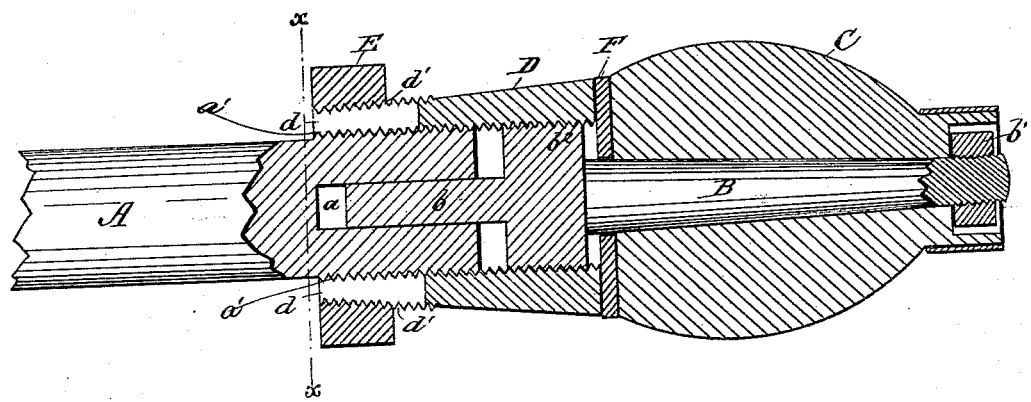
Figure 2:
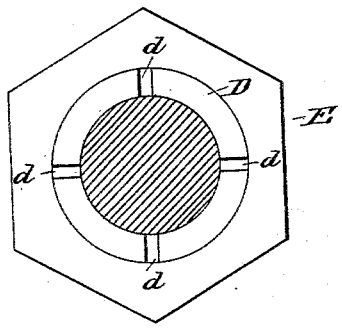

Figure 1 is a longitudinal section through one end of an axle embodying my improvements. Fig. 2 is a cross-section through the same, taken on the line $x$ $x$ in Fig. 1.

My invention relates to axles for vehicles; and it consists in the detailed construction and combination of the parts hereinafter described, for adjusting the wheels upon the axle when worn at the hub, and at the same time maintaining them at the same distance apart.

In the accompanying drawings similar letters of reference indicate corresponding parts in all the figures.

A is the vehicle-axle, provided with a cross-slot, $a$, in which is placed the tongue $b$ of the journal B, which is made separate from the main body A of the axle instead of being made solid with it, as in axles as ordinarily constructed. The axle A also has a screw-thread, $a'$, upon the end of it. The journal B is provided with a nut, $b'$, at the extreme end, similar to that commonly in use for retaining the wheels in position.

$b^2$ is a collar, the outside surface of which is screw-threaded and of the same size as the screw-thread $a'$ on the end of the axle.

C is the hub of the vehicle-wheel, which runs upon the journal B.

D is a sleeve screw-threaded internally and made tapering on the outside, so as to be thicker at the end next the hub C. The other end of sleeve D has slots $d$ cut in it, and the screw-thread $d'$ formed upon its outside tapering surface.

E is a lock-nut, which works upon the screw-thread $d'$ and operates so as to draw together the portions of the sleeve D between the slots $d$ when screwed up.

F is a washer, placed between the hub C and the end of the sleeve D coming next to it.

In order to take up the wear between the ends of the hubs and the washers they run against, the sleeves D, together with the vehicle-wheels, are first removed from the end of the axle. The tongue $b$ is then driven farther into the slot $a$ in the end of the axle, the distance through which it is moved being made to correspond to the amount of wear between the outer end of the hub and the nut $b'$, or the washer behind it, if a washer is used. The sleeve D is then screwed over the collar $b^2$ and the end of the axle, and the vehicle-wheel restored to its position on the journal B.

To compensate for the wear which has taken place between the washer F and the end of the hub coming next to it, the sleeve D is then screwed toward the wheel until the hub runs freely on the journal without any side shake or play. The lock-nut E can then be screwed up on the end of sleeve D, so as to clamp it upon the end of the axle.

Having thus described my invention, what I claim as new, and desire to secure by Letters Patent, is—

1. The improved axle herein described, consisting of the axle proper or body A, provided with an opening, $a$, made angular in cross-section, and having an external thread, $a'$, the spindle having a stem, $b$, corresponding in cross-section to and fitted in the opening $a$, and having a threaded enlargement, $b^2$, and a sleeve, D, threaded onto the enlargement $b^2$ and onto the end of the axle proper.

2. The combination of the axle A, having angular opening $a$ and thread $a'$, the spindle having a threaded enlargement, $b^2$, and an angular stem, $b$, projected into the opening $a$, the externally-tapered sleeve D, threaded onto the axle and the portion $b^2$ of the spindle, and having its inner end divided by slots $d$, and the nut E, turned on the inner end of the tapered sleeve, substantially as set forth.

The above specification of my invention signed by me in the presence of two subscribing witnesses.

JAMES IRVIN McCALOP.

Witnesses:
SOLON C. KEMON,
CHAS. A. PETTIT.